(12) United States Patent
Jeong

(10) Patent No.: US 8,356,006 B2
(45) Date of Patent: Jan. 15, 2013

(54) METHOD OF EFFECTIVELY MANAGING DATABASE SYSTEM FOR MOBILE NUMBER PORTABILITY

(75) Inventor: Young Sic Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 298 days.

(21) Appl. No.: 12/086,048

(22) PCT Filed: Nov. 28, 2006

(86) PCT No.: PCT/KR2006/005042
§ 371 (c)(1),
(2), (4) Date: Jun. 5, 2008

(87) PCT Pub. No.: WO2007/066922
PCT Pub. Date: Jun. 14, 2007

(65) Prior Publication Data
US 2009/0313306 A1    Dec. 17, 2009

(30) Foreign Application Priority Data

Dec. 8, 2005   (KR) ................. 10-2005-0119994

(51) Int. Cl.
*G06F 17/30* (2006.01)
(52) U.S. Cl. ................................... 707/609
(58) Field of Classification Search .............. 707/609
See application file for complete search history.

(56) References Cited

U.S. PATENT DOCUMENTS

| 5,136,707 | A | | 8/1992 | Block et al. |
| 6,064,887 | A | * | 5/2000 | Kallioniemi et al. ......... 455/445 |
| 6,161,017 | A | | 12/2000 | Britt et al. |
| 2002/0052211 | A1 | | 5/2002 | Kim et al. |
| 2004/0052240 | A1 | * | 3/2004 | Stahl et al. ................... 370/351 |
| 2004/0053610 | A1 | | 3/2004 | Kim |
| 2004/0073683 | A1 | * | 4/2004 | Beck et al. ................... 709/227 |

FOREIGN PATENT DOCUMENTS

KR    1997-0001917    2/1997

OTHER PUBLICATIONS

Patent Abstract of Europe, European Publication No. 1104158A1, Published May 30, 2001.
International Search Report mailed Feb. 26, 2007 in connection with the International application PCT/KR2006/005042.

* cited by examiner

*Primary Examiner* — Khanh Pham
*Assistant Examiner* — Johnese Johnson
(74) *Attorney, Agent, or Firm* — Staas & Halsey LLP

(57) ABSTRACT

A method of effectively managing a database system for mobile number portability (MNP) including constructing a database associated with the MNP of a neutral organization including a first database connected to number portability management systems of a plurality of wired or wireless telecommunications service providers and a second database connected to subscriber managements systems of the wireless telecommunications service providers; transmitting data required for number portability call processing to the first database after the number portability processing for the wired telecommunications service providers has been completed by the second database; and allocating associated information to the wired or wireless telecommunications service providers requiring the number portability call processing by the first database based on the data. Accordingly, a conventional database management system can be modified, and a specific packet structure can be employed to detect errors that occur during transmission and reception of customer information for the number portability processing. Therefore, it is possible to construct effective subscriber management systems for mobile number portability.

3 Claims, 3 Drawing Sheets

METHOD OF EFFECTIVELY MANAGING DATABASE SYSTEM FOR MOBILE NUMBER PORTABILITY

CROSS-REFERENCE TO RELATED PATENT APPLICATION

This application claims the benefit under 35 U.S.C. Section 371, of PCT International Application Number PCT/KR2006/005042, filed Nov. 28, 2006, which claimed priority to Korean Patent Application No. 10-2005-0119994, filed on Dec. 8, 2005, in the Korean Intellectual Property Office, the disclosure of which is incorporated herein in its entirety by reference.

BACKGROUND OF THE INVENTION

1. Field of the Invention

The present invention relates to a method of effectively managing a database system for mobile number portability (MNP), and more particularly, to a method of effectively managing a database system for MNP capable of constructing a MNP subscriber management database system including a number portability-customer database (NP-CDB) and a mobile number portability-customer database (M-NPDB), wherein the NP-CDB transmits and receives subscriber information associated with number portability to and from major mobile communication companies by using Transmission Control Protocol/Internet Protocol (TCP/IP) packets having a predetermined structure and processes the information, and wherein the M-NPDB allocates four pieces of information required for number portability call processing to infrastructure companies requiring number portability call processing after processing the subscriber information of the NPCDB, thereby processing the subscriber information that was processed for the MNP in real-time and transmitting routing information to wired or wireless service providers through a secure common object request broker architecture (CORBA).

2. Description of the Related Art

FIG. 1 is a view illustrating a structure of a conventional database system for mobile number portability (MNP). A central number portability database (NPDB) system 110 is connected with NPDB systems 120 and 130 of existing wired networks, portability processing systems 140 and 150 of mobile telecommunications networks, and agencies 160 and 170 of mobile telecommunications companies. When a subscriber requests number portability from the agency 160 or 170, the central NPDB system 110 requests number portability from a mobile telecommunications company with which the subscriber is currently registered, receives the result, and transmits the result to the agency that the subscriber contacted. Thereafter, the agency 160 or 170 receives the result and registers the subscriber with the mobile telecommunications subscriber management system of a company that the agency belongs to. As described above, in the conventional method, the local-NPDB (L-NPDB) update and subscriber information transmission for call processing between a mobile telecommunications number portability center and the mobile telecommunications company cannot be easily carried out in real-time. In addition, information for call processing and information for subscriber registration are separately managed, so that it is difficult to guarantee data integrity. As described above, the conventional method involves a complicated procedure, and all processes are not carried out in real-time. Therefore, there is a problem in that it takes a long time in terms of hours or days to complete the number portability for the subscriber.

SUMMARY OF THE INVENTION

The present invention provides a method of managing a database system for mobile number portability (MNP) by constructing a highly reliable, effective subscriber management system using a database system of a neutral organization for the mobile number portability including two systems that cooperate with each other and mobile telecommunications service providers and wired service providers through dedicated lines, thereby effectively processing a mobile number portability request.

According to an aspect of the present invention, there is provided a method of effectively managing a database system for MNP including: constructing a database associated with the MNP of a neutral organization including a first database connected to number portability management systems of a plurality of wired or wireless telecommunications service providers and a second database connected to subscriber managements systems of the wireless telecommunications service providers; transmitting data required for number portability call processing to the first database after number portability processing for the wireless telecommunications service providers has been completed by the second database; and allocating associated information to the wired or wireless telecommunications service providers requiring the number portability call processing by the first database based on the data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
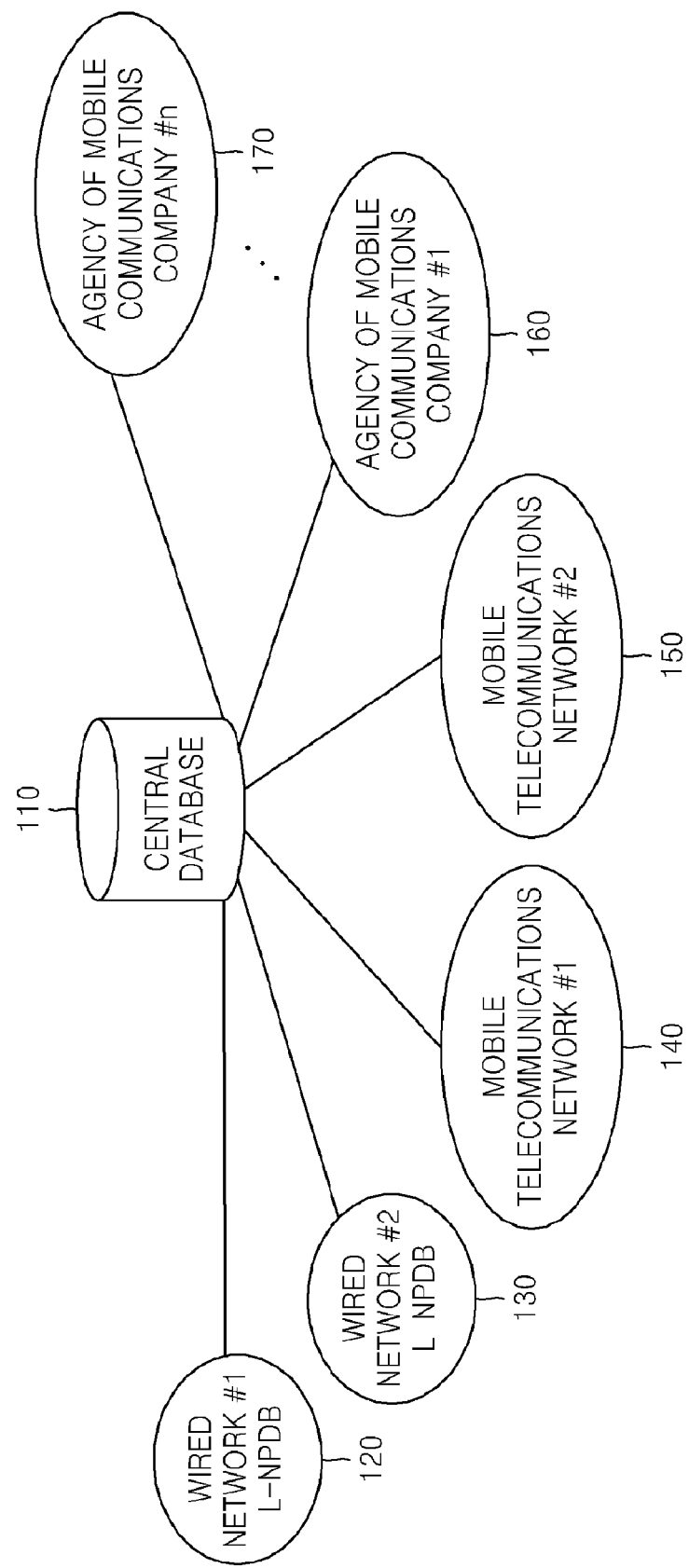
FIG. 1 is a view illustrating a structure of a conventional database system for mobile number portability (MNP)
Figure 2:
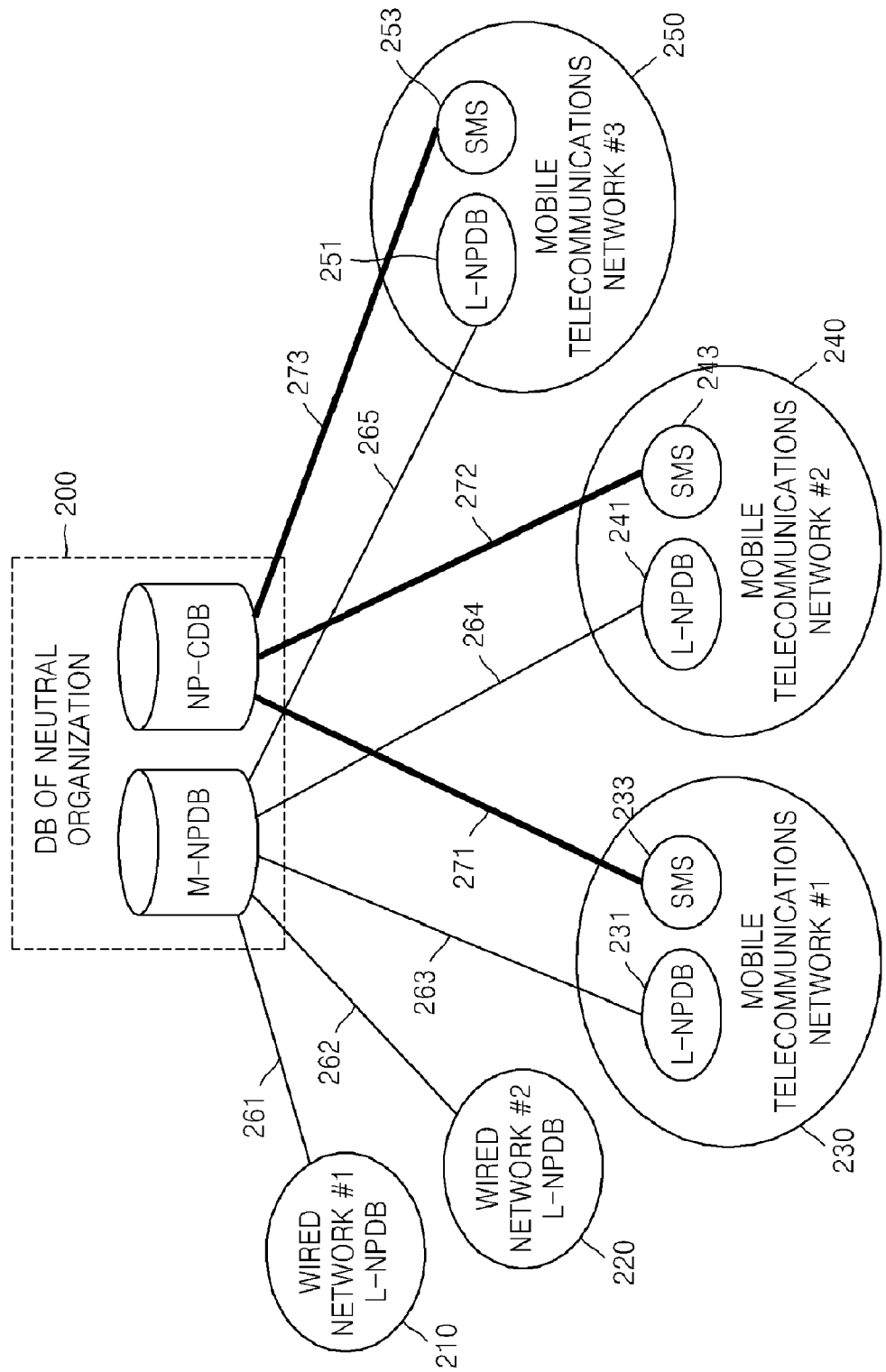
FIG. 2 is a view illustrating an effective subscriber management system for MNP according to an embodiment of the present invention.
Figure 3:
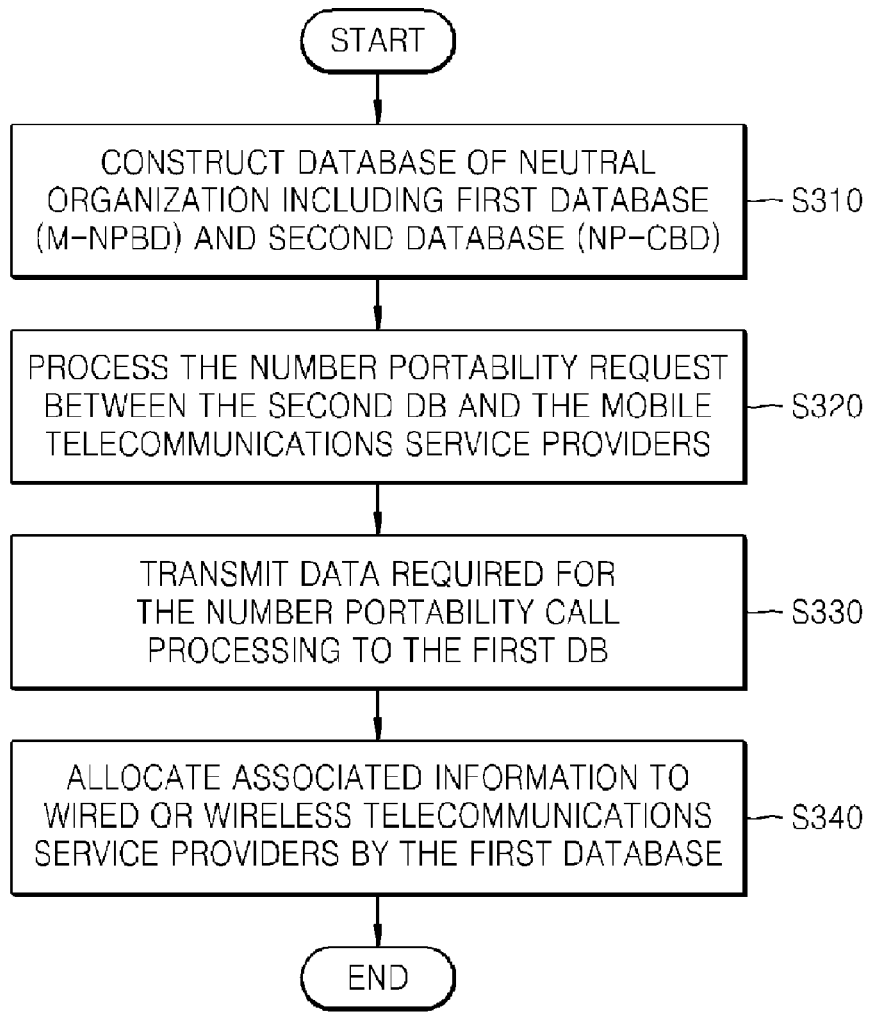
FIG. 3 is a flowchart illustrating a method of managing an effective subscriber management system for MNP according to an embodiment of the present invention.
Figure 4:
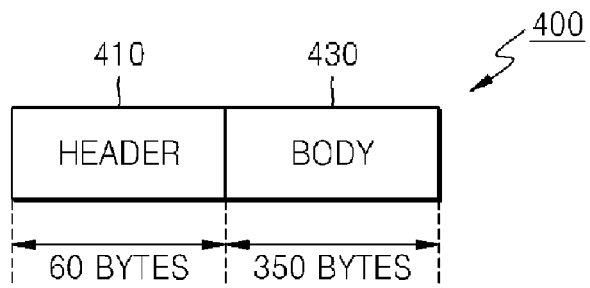
FIG. 4 is a view illustrating a structure of a packet for information transmission and reception between subscriber management systems of mobile telecommunications companies and a number portability-customer database (NP-CDB) of a database system for MNP according to an embodiment of the present invention.

Now, exemplary embodiments according to the present invention will be described in detail with reference to the accompanying drawings. FIG. 2 is a view illustrating an effective subscriber management system for mobile number portability (MNP) according to an embodiment of the present invention. FIG. 3 is a flowchart illustrating a method of managing an effective subscriber management system for MNP according to an embodiment of the present invention. FIG. 4 is a view illustrating a structure of a packet for information transmission and reception between subscriber management systems of mobile telecommunications company and a number portability-customer database (NP-CDB) of a database system for MNP according to an embodiment of the present invention.

Referring to FIG. 2, unlike a conventional subscriber management system, a database 200 of a neutral organization includes the NP-CDB system directly connected to subscriber management systems 233, 243, and 253 of mobile telecommunications service providers by using Transmission Control Protocol/Internet Protocol (TCP/IP) packets, as illustrated in FIG. 4, and a main-NPDB (M-NPDB) system cooperating with local-NPDB (L-NPDB) systems 231, 241, and 251 of the mobile telecommunications companies and transmitting information for a number portability call processing based on a result of processing of the NP-CDB to L-NPDB systems 210 and 220 of wired networks #1 and #2 210, 220, and mobile telecommunications networks #1, #2, and #3 230, 240, and 250 by using a common object request broker architecture (CORBA). In the database 200 including both systems, the NP-CDB system can cooperate with the subscriber management systems 233, 243, and 253 of the mobile telecommunications service providers in real-time, so that a number portability request of a subscriber can be processed in real-time. In addition, information needed after processing subscriber information is copied, so that data for call routing can be transmitted to the L-NPDB systems 231, 241, and 251 of the mobile telecommunications companies in real-time. As described above, the database 200, which is doubly constructed, can process the number portability request of the subscriber and transmit routing information in real-time. Therefore, it is possible to transmit information highly efficiently and reliably so that the whole number portability system can be well managed.

Referring to FIG. 2, connection relations will be described. The database 200 includes the M-NPDB system and the NP-CDB system. The NP-CDB system of the database 200 is connected to the subscriber management systems 233, 243, and 253 of mobile telecommunications networks #1, #2, and #3 230, 240, and 250 through dedicated lines 271, 272, and 273, respectively. The NP-CDB system of the database 200 may be connected to more mobile telecommunications networks service providers by increasing the capacity and the interface capacity thereof.

The M-NPDB system of the database 200 is connected to the L-NPDB systems 210 and 220 of wired networks #1 and #2 through dedicated lines 261 and 262, respectively, and is connected to L-NPDB systems 231, 241, and 251 of the mobile telecommunications networks #1, #2, and #3 230, 240, and 250 through dedicated lines 263, 264, and 265, respectively. The M-NPDB of the database 200 may be connected to more L-NPDB systems of telecommunications network service providers by increasing the capacity and the interface capacity thereof.

Now, referring to FIG. 3, illustrates a flowchart of the method of effectively managing the effective database system for MNP are described. First, a database 200 of the neutral organization includes two database systems defined as the M-NPDB (referred to as a first database in the Claims) system and the NP-CDB system (referred to as a second database in the Claims) in operation S310.

The NP-CDB system of the database 200 cooperates with the subscriber management systems 233, 243, and 253 of the mobile telecommunications networks service providers, performs the number portability request processing by relaying data between the mobile telecommunications networks service providers, and records data associated with the relay as log files. All operations of the NP-CDB are recorded, and the number portability processing has to be performed by the NP-CDB system, so that the number portability system operates stably, and associated errors are easily analyzed in operation S320.

After the number portability processing in the NP-CDB system of the database 200 has been completed, data for number portability call processing is immediately transmitted to the M-NPDB system of the database 200 in operation S330.

The M-NPDB system of the database 200, which receives data for number portability call processing, transmits the data for number portability call processing to the L-NPDB systems 210 and 220 of wired networks #1 and #2, and the L-NPDB systems 231, 241, and 251 of the mobile telecommunications networks #1, #2, and #3 through the dedicated lines 261, 262, 263, 264, and 265 by using the CORBA in operation S340. The data for number portability call processing that is transmitted by using the CORBA are immediately recorded in the L-NPDB systems 210, 220, 231, 241, 251 of the wired or wireless service providers in order to be used for the mobile number portability call processing.

FIG. 4 is a view illustrating a structure of a packet 400 for information transmission and reception between the subscriber management systems 233, 241, and 253 of the mobile telecommunications networks service providers and the NP-CDB system of the database 200 for MNP according to an embodiment of the present invention.

The packet 400 for subscriber information transmission is split into a header 410 containing 60 bytes and a body 430 containing 350 bytes. The header 400 contains items as illustrated in Table 1. The body 430 contains information corresponding to the header that is to be received or transmitted.

TABLE 1

| No | Items | Type | length |
|---|---|---|---|
| 1 | Length Of Packet | Num | 4 |
| 2 | Transmitting Entity | Char | 1 |
| 3 | Processing Date | Num | 8 |
| 4 | Processing Time | Num | 6 |
| 5 | Packet Number | Num | 6 |
| 6 | Business Division | Char | 4 |
| 7 | Message Tracking Number | Char | 15 |
| 8 | Response Code | Char | 6 |
| 9 | Number Portability Limited Customer | Num | 1 |
| 10 | Reserved | Char | 9 |
| — | Total | — | — |

As described above, in the method of effectively managing the database system for MNP according to the present invention, the conventional database management system can be modified, and a specific packet structure can be employed to detect errors which occur during transmission and reception of customer information for the number portability processing. Therefore, it is possible to construct effective subscriber management systems for mobile number portability.

In addition, unlike the conventional database system, routing information and subscriber information are separately managed by two systems, and the NP-CDB system cooperates with the subscriber management systems of the mobile telecommunications networks service providers by using the TCP/IP packet having a specific structure. Therefore, subscriber information can be processed stably and rapidly. In addition, the important routing information for number portability call processing is processed through cooperation between the M-NPDB and the L-NPDB based on the CORBA. Therefore, the actual number portability call processing based on the number portability can be performed accurately and rapidly.

In addition, the number portability call processing is performed in real-time between the NP-CDB system and the subscriber management systems by using the TCP/IP packet having a predetermined length, so that errors during the transmission and reception are easily detected. In addition, the code values of all operations associated with the number portability are defined, so that it is possible to complete the mobile number portability request in minimum time.

In addition, the M-NPDB system, which is managed separately from the NP-CDB system and cooperates with the wired or wireless service providers by using the CORBA, finally receives data for the number portability call processing after processing for the subscriber, so that it is possible to process actual number portability. In addition, the M-NPDB system cooperates with the NP-CDB to immediately transmit the required data to the L-NPDB systems of the wired or wireless telecommunications service providers. Therefore, it is possible to carry out the number portability call processing immediately.

The method of effectively managing the database system for MNP according to the present invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. A font ROM data structure according to the present invention can also be embodied as computer readable codes on a computer readable recording medium such as ROM, RAM, CD-ROMs, magnetic tapes, floppy disks, optical data storage devices, and carrier waves. While the present invention has been particularly illustrated and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of effectively managing a database system for mobile number portability (MNP) comprising:

constructing a database associated with the MNP including a first database connected to number portability management systems of a plurality of wired or wireless telecommunications service providers through dedicated lines based on a common object request broker architecture (COBRA) and a second database connected to subscriber managements systems of the wireless telecommunications service providers through dedicated lines using Transmission Control Protocol/Internet Protocol (TCP/IP);

transmitting data required for number portability call processing to the first database after number portability processing with the wireless telecommunications service providers has been completed by the second database; and allocating associated information to the wired or wireless telecommunications service providers requiring the number portability call processing by the first database based on the data, wherein the second database stores, provides subscriber information associated with number portability, and is connected to subscriber management systems of the wired or wireless telecommunications service providers through dedicated lines to transmit and receive the subscriber information by using predetermined Transmission Control Protocol/Internet Protocol (TCP/IP) packets, and wherein the TCP/IP packets have a packet structure that is split into a header containing information on the length of packet, transmitting subject, processing date, processing time, packet number, business division, message tracking number, response code, whether or not customer is permitted for number portability, and reserved field, and a body.

2. The method of claim 1, wherein the first database stores and provides information required for number portability call routing.

3. A method of effectively managing a database system for mobile number portability (MNP) comprising:

constructing a database associated with the MNP including a first database connected to number portability management systems of a plurality of wired or wireless telecommunications service providers and a second database connected to subscriber managements systems of the wireless telecommunications service providers;

transmitting data required for number portability call processing to the first database after number portability processing with the wireless telecommunications service providers has been completed by the second database; and allocating associated information to the wired or wireless telecommunications service providers requiring the number portability call processing by the first database based on the data, wherein the second database stores and provides subscriber information associated with number portability, wherein the second database is connected to subscriber management systems of the wired or wireless telecommunications service providers through dedicated lines to transmit and receive the subscriber information by using predetermined Transmission Control Protocol/Internet Protocol (TCP/IP) packets, wherein the TCP/IP packets have a packet structure that is split into a header containing information on the length of packet, transmitting subject, processing date, processing time, packet number, business division, message tracking number, response code, whether or not customer is permitted for number portability, and reserved field, and a body.

* * * * *